(12) United States Patent
Zhao et al.

(10) Patent No.: US 9,878,920 B2
(45) Date of Patent: Jan. 30, 2018

(54) WHITE PIGMENT DISPERSIONS

(71) Applicant: Hewlett-Packard Development Company, L.P., Houston, TX (US)

(72) Inventors: Yan Zhao, Palo Alto, CA (US); Howard S. Tom, San Jose, CA (US); Hou T. Ng, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/908,009

(22) PCT Filed: Sep. 27, 2013

(86) PCT No.: PCT/US2013/062239
§ 371 (c)(1),
(2) Date: Jan. 27, 2016

(87) PCT Pub. No.: WO2015/047306
PCT Pub. Date: Apr. 2, 2015

(65) Prior Publication Data
US 2016/0221836 A1    Aug. 4, 2016

(51) Int. Cl.
*C01G 23/053* (2006.01)
*C09D 11/023* (2014.01)
(Continued)

(52) U.S. Cl.
CPC ....... *C01G 23/053* (2013.01); *C01G 23/0532* (2013.01); *C09C 1/00* (2013.01); *C09C 1/3676* (2013.01); *C09D 5/028* (2013.01); *C09D 7/1216* (2013.01); *C09D 11/023* (2013.01); *C09D 11/102* (2013.01); *C09D 11/322* (2013.01); *C09D 17/00* (2013.01); *C09D 17/008* (2013.01);
(Continued)

(58) Field of Classification Search
None
See application file for complete search history.

(56) References Cited

U.S. PATENT DOCUMENTS 3,615,972 A * 10/1971 Morehouse, Jr. ........ B01J 13/18
156/276
4,089,800 A *  5/1978 Temple ................. A01N 25/28
106/312
(Continued)

FOREIGN PATENT DOCUMENTS

EP     1189997     3/2002
EP     1818373     8/2007
(Continued)

OTHER PUBLICATIONS

International Search Report and Written Opinion for International Application No. PCT/US2013/062239 dated Jun. 26, 2014, 11 pages.
(Continued)

*Primary Examiner* — Peter A Salamon
(74) *Attorney, Agent, or Firm* — HP Inc. Patent Department

(57) ABSTRACT

A white pigment dispersion includes 10 to 60 wt % of low effective density $TiO_2$, 1 to 40 wt % of a latex, and the balance a dispersing medium. Inks using the low effective density $TiO_2$ and methods for preparing the low effective density $TiO_2$ are also disclosed.

14 Claims, 3 Drawing Sheets

(51) Int. Cl.
*C09D 11/102* (2014.01)
*C09D 11/322* (2014.01)
*C09D 17/00* (2006.01)
*C09C 1/00* (2006.01)
*C09C 1/36* (2006.01)
*C09D 5/02* (2006.01)
*C09D 7/12* (2006.01)
*C08K 3/22* (2006.01)

(52) U.S. Cl.
CPC ...... *C01P 2004/01* (2013.01); *C01P 2004/34* (2013.01); *C01P 2004/62* (2013.01); *C01P 2006/11* (2013.01); *C08K 2003/2241* (2013.01)

(56) References Cited

U.S. PATENT DOCUMENTS

| | | | |
|---|---|---|---|
| 4,427,836 A * | 1/1984 | Kowalski | C08F 2/22 523/201 |
| 4,888,241 A * | 12/1989 | Melber | B01J 13/206 428/222 |
| 4,898,892 A * | 2/1990 | Melber | B01J 13/206 427/222 |
| 4,898,894 A * | 2/1990 | Melber | B01J 13/206 427/222 |
| 4,908,391 A * | 3/1990 | Melber | B01J 13/206 427/222 |
| 4,912,139 A * | 3/1990 | Melber | B01J 13/206 427/222 |
| 5,011,862 A * | 4/1991 | Melber | B82Y 30/00 521/54 |
| 5,071,823 A * | 12/1991 | Matsushita | B41M 5/52 428/323 |
| 5,340,537 A | 8/1994 | Barrett | |
| 6,790,272 B1 | 9/2004 | Zhao et al. | |
| 6,942,724 B2 | 9/2005 | Yu | |
| 7,045,005 B2 | 5/2006 | Sakatani et al. | |
| 7,635,504 B2 | 12/2009 | Elwakil et al. | |
| 7,723,400 B2 | 5/2010 | Kobayashi et al. | |
| 7,812,064 B2 | 10/2010 | Odell et al. | |
| 2003/0055178 A1 | 3/2003 | Gore et al. | |
| 2004/0067193 A1 | 4/2004 | Sakatani et al. | |
| 2004/0151662 A1 | 8/2004 | Yoshida et al. | |
| 2005/0146544 A1 * | 7/2005 | Kondo | C09D 11/30 347/7 |
| 2006/0125902 A1 | 6/2006 | Figov | |
| 2006/0155005 A1 | 7/2006 | Kondo et al. | |
| 2006/0260509 A1 * | 11/2006 | Evers | D21H 21/30 106/234 |
| 2006/0275606 A1 | 12/2006 | Mizutani | |
| 2008/0182083 A1 * | 7/2008 | Oyanagi | C09D 11/322 428/195.1 |
| 2009/0312181 A1 * | 12/2009 | Do | B01J 21/063 502/339 |
| 2011/0143923 A1 | 6/2011 | Bette et al. | |
| 2013/0017373 A1 | 1/2013 | Wu et al. | |

FOREIGN PATENT DOCUMENTS

| | | |
|---|---|---|
| EP | 2719711 | 4/2014 |
| JP | 2004250559 | 9/2004 |
| JP | 2006274214 A * | 10/2006 |
| WO | WO-2012170036 | 12/2012 |
| WO | WO 2012/051641 | 4/2014 |
| WO | WO 2014/193387 | 12/2014 |

OTHER PUBLICATIONS

The Extended European Search Report for International Application No. PCT/US2013/062239 dated Aug. 30, 2016, 16 pages.
The Partial Supplementary European Search Report for International Application No. PCT/US2013/062239 dated Jun. 21, 2016, 8 pages.

* cited by examiner

100

```
┌─────────────────────────┐
│   PROVIDE A TEMPLATE    │
│    HAVING A SURFACE     │
│           105           │
└───────────┬─────────────┘
            │
            ▼
┌─────────────────────────┐
│  COAT THE TEMPLATE SURFACE │
│  WITH TITANIUM OXYSULFATE  │
│           110           │
└───────────┬─────────────┘
            │
            ▼
┌─────────────────────────┐
│ REMOVE THE TEMPLATE, THEREBY│
│ FORMING POROUS TiO₂ PARTICLES│
│           115           │
└─────────────────────────┘
```

*Fig. 1*

WHITE PIGMENT DISPERSIONS

BACKGROUND

There are several reasons that inkjet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to inkjet ink chemistry, the majority of commercial inkjet inks are water-based. Thus, their constituents are generally water-soluble, as in the case of many dyes, or water dispersible, as in the case of pigments. Furthermore, inkjet inks have low viscosity to accommodate high frequency jetting and firing chamber refill processes common to thermal inkjet architecture.

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a printhead across the ink-receiver or vice versa or both.

When jetting the inkjet ink onto an ink-receiver, the ink typically includes a liquid vehicle and one or more solids, such as dyes or pigments and polymeric binders. It will be readily understood that the optimal composition of such ink is dependent on the printing method used and on the nature of the ink-receiver to be printed.

An ink jet white ink provides a recorded product with a good visibility when printed on a surface with a low lightness such as a black surface. In addition, the white ink is also useful for marking industrial products such as those made of plastic products and is also suitable for printing onto woods, metals, glass, porcelain and leather, thus having been investigated from various aspects.

BRIEF DESCRIPTION OF THE DRAWINGS

FIG. 1 is a flow diagram for the manufacture of low effective density titania, according to an example.

DETAILED DESCRIPTION

Figure 2:
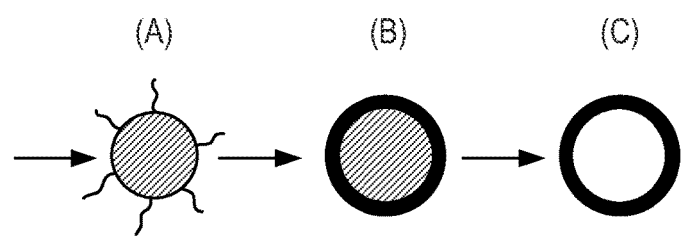
FIG. 2 shows a schematic diagram of a first synthesis path to manufacturing low effective density titania, according to an example.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an inkjet ink. Liquid vehicles are known in the art, and a wide variety of ink vehicles may be used in accordance with examples of the present disclosure. Such ink vehicles may include a mixture of a variety of different agents, including without limitation, surfactants, organic solvents and co-solvents, buffers, biocides, viscosity-modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, "co-solvent" refers to any solvent, including organic solvents and/or water, present in the ink vehicle, used in dispersing a pigment, or used in polymerization reactions. Such co-solvents also facilitate good nozzle health in inkjet printheads by controlling the evaporation of solvents and/or water, puddling of the ink, etc.

As used herein, "pigment" generally includes pigment colorants, magnetic particles, metallic particles, metal oxides such as aluminas, silicas, titanias, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In some examples, however, the pigment is a pigment colorant.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" refers to nitrogen, oxygen, halogens, phosphorus, or sulfur.

As used herein, "alkyl" refers to a branched, unbranched, or cyclic saturated hydrocarbon group, which typically, although not necessarily, contains from 1 to about 8 carbon atoms. Alkyls include, but are not limited to, methyl, ethyl, n-propyl, isopropyl, n-butyl, isobutyl, t-butyl, and octyl, for example, as well as cycloalkyl groups such as cyclopentyl, and cyclohexyl, for example. As used herein, "substituted alkyl" refers to an alkyl substituted with one or more substituent groups. The term "heteroalkyl" refers to an alkyl in which at least one carbon atom is replaced with a heteroatom. If not otherwise indicated, the term "alkyl" includes unsubstituted alkyl, substituted alkyl, and heteroalkyl.

As used herein, $T_g$ is the glass transition temperature as calculated by the Fox equation: copolymer $T_g = 1/[W_a(T_gA) + W_b(T_gB) + \ldots]$ where $W_a$=weight fraction of monomer A in the copolymer and $T_gA$ is the homopolymer $T_g$ value of monomer A, $W_b$=weight fraction of monomer B and $T_gB$ is the homopolymer $T_g$ value of monomer B, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and subrange is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1 to 3, from 2 to 4, and from 3 to 5, etc. This same principle applies to ranges reciting only one numerical value. Furthermore, such an interpretation should apply regardless of the breadth of the range or the characteristics being described.

Water-based white ink dispersions for inkjet applications typically suffer from dispersion instability. Aggregation and sedimentation of high-density (~4.7) titanium oxide ($TiO_2$), a white pigment commonly used in white printing inks, is one of the primary reasons for the dispersion instability challenge. Although the challenge can be overcome by using sub-50 nm titanium oxide pigment, the desired white opacity is difficult to attain due to the undesirable increased transparency of the pigment. Hence, white pigment that ranges from between about 100 to 250 nm may be used in many cases. However, the increased pigment size leads to the dispersion instability, and in some cases, poor jetting performance.

"Low Density" Titanium Oxide

Broadly, a method for manufacturing low effective density $TiO_2$ is depicted in FIG. 1. The method 100 includes:
  providing 105 a template having a surface;
  coating 110 the template surface with a titanium-containing compound that can be reduced to $TiO_2$ at high temperature; and
  removing 115 the template, thereby forming porous $TiO_2$ particles.

In accordance with the teachings herein, the dispersion instability due to sedimentation may be suppressed by employing titanium oxide (titania, $TiO_2$) pigments of lower effective density. Current commercially-available $TiO_2$ pigments have densities in excess of 4. By "low density" titania is meant titania having a density of less than 4. In some examples, the density of the titania employed in the practice of the teachings herein is in the range of about 2.5 to 3.8. In any event, the density of titania has been reduced by introducing porosity into the titania particles. Accordingly, it may be more accurate to indicate that the titania has an "effective" density that is lower than commercially-available $TiO_2$ pigments.

In some examples, the template may be a polymer template or oxygen bubbles. Further details are given below with respect to Routes I and II for preparing low effective density $TiO_2$.

Examples of water-soluble titanium salts include, but are not limited to, titanium-containing compounds that can be reduced to $TiO_2$ at high temperature. Examples include titanium oxysulfate, titanium diisopropoxide bis(acetylacetonate), titanium(IV) ethoxide, and tetrakis-(diethylamido)titanium(IV). As used herein, "high temperature" means a temperature of at least 500° C.

The step of removing the template may include calcining. The calcining step may be performed at a temperature of at least 500° C. for at least 5 hours. Of course, as is customary in calcining procedures, a single temperature may be employed in some cases, either with a single time or a stepped sequence of times. In other cases, a stepped sequence of temperatures and times may be employed. Routine experimentation will determine an appropriate calcining procedure to produce $TiO_2$ particles having a low effective density.

Figure 3:
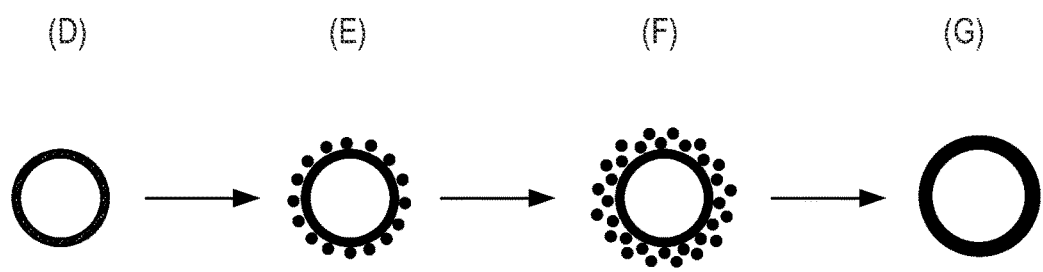
FIG. 3 shows a schematic diagram of a second synthesis path to manufacturing low effective density titania, according to an example.

In order to reduce the density, two chemical synthetic routes have been developed to derive "porous" $TiO_2$ pigment of lower effective density. For titania having a density of about 2.5 to 3.8, a porosity on the order of about 50% or so may be implied. FIGS. 2 and 3 each depict a synthesis path, Route I and Route II, respectively, to form the desired low effective density $TiO_2$ pigment.

FIG. 2 shows a schematic diagram of the first synthesis path, depicting synthetic Route I (polymer emulsion+ $TiOSO_4.xH_2SO_4.xH_2O$) to the attainment of low effective density porous $TiO_2$ white pigment. Route I is based on a polymer templating approach and relies on the tendency of $Ti^{4+}$ to coordinate to carboxylate groups. A polymer emulsion template with carboxylate groups may be prepared. $Ti^{4+}$ on a surface of (Step A), and then $Ti^{4+}$, employing titanium oxysulfate, may be allowed to adsorb on the surface (Step B). The polymer template may then be removed, such as by calcination (Step C). Two polymers have been used to prepare the template emulsions, namely, poly(methyl vinyl ether-alt-maleic acid) and A-C 5180 ethylene-acrylic acid (EAA) polymer.

In an example, a partially neutralized Solution 1 of poly(methyl vinyl ether-alt-maleic acid), and Solution 2 of A-C 5180 EAA polymer was prepared. In particular, in this example, Solution 1 was made up of 100.7 g poly(methyl vinyl ether-alt-maleic acid), 54.9 g 50% NaOH, and 758.1 g water. Solution 2 was made up of 194 g A-C® 5180 resin (an ethylene-acrylic acid copolymer), available from Honeywell Waxes (Morristown, N.J.), 51.6 g 50% NaOH, and 580.5 g water. Solution 3 was made up of 150 g $TiOSO_4.xH_2SO_4.xH_2O$ and 850 g water.

To prepare the low-density $TiO_2$, 1.0 g Solution 1, 5.16 g Solution 2 and 20 g water were combined to form a polymer emulsion with very good stability against acid. Next, 40 g Solution 3 was added to form a stable Ti(IV) polymer emulsion mixture. The water was evaporated and the resulting solid was calcined at 550° C. for 1 hour, then 660° C. for 5 hours.

Table I shows the stability of different mixtures of 1 and 2 in the presence of Precursor 3 (solution of titanium(IV) oxysulfate). As shown in Table I below, 1 is a stable solution and it is unstable in 3, whereas 2 is stable in the presence of 3. At a low weight percentage of 1 (<16.24%), a polymer emulsion can be obtained which is stable in the presence of Precursor 3.

TABLE I

Stability of Mixtures of Solutions 1 + 2.

| Weight % (of Solutions) | | Stability in Water | Stability in Water + Precursor 3 |
|---|---|---|---|
| 1 | 2 | | |
| 0 | 100 | Y | N |
| 43.55 | 56.45 | Y | N |
| 81.88 | 18.12 | Y | N |
| 83.76 | 16.24 | Y | Y |
| 100 | 0 | Y | Y |

Polymer templates of specific building blocks may enhance buoyancy of the low effective density pigments. More specifically, polymer templates with molecular weight (Mn) between about 70K to 120K, a repeating unit of methyl vinyl ether-alt-maleic acid, and an end group of methyl group may work well with low effective density $TiO_2$ pigments. Examples of such polymer dispersants include poly(methyl vinyl ether-alt-maleic acid). Surfactants such as Joncryl HPD 671 and E-sperse may have an effect similar to that of poly(methyl vinyl etheralt-maleic acid). In some examples, a mixture of these surfactants may work particularly well for the low effective density $TiO_2$ pigments.

FIG. 3 illustrates the concept of an alternate path to forming low effective density $TiO_2$, called Route II. Using this route, oxygen bubbles serve as the templates to synthesize porous and hollow $TiO_2$ pigments having low effective density.

The chemical reaction sequence for obtaining low effective density $TiO_2$ pigments is shown below:

$$Ti^{4+}+H_2O \rightarrow TiO^{2+}+2H^+$$

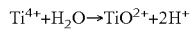

$$TiO^{2+}+H_2O_2 \rightarrow [TiO(H_2O_2)]^{2+}$$

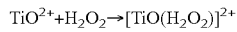

$$2H_2O_2 \rightarrow 2H_2O+O_2\uparrow$$

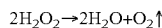

$$CO(NH_2)_2+3H_2O \rightarrow NH_3.H_2O \rightarrow TiO(OH)_2\downarrow+2NH_4^+ + H_2O_2$$

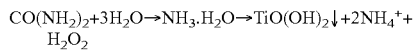

$$TiO(OH)_2 \rightarrow TiO_2+H_2O.$$

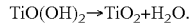

In an example for synthesizing $TiO_2$ hollow spheres, 100.1 g titanium (IV) oxysulfate ($TiOSO_4.xH_2SO_4.xH_2O$) was slowly introduced to a mixture of 59 mL 30% $H_2O_2$ solution, 11.4 g $CO(NH_2)_2$, and 33.6 g distilled water, with magnetic stirring to form a characteristic bright orange solution. Then, the mixture was stirred overnight, and the water was evaporated to yield a deep brown tacky mixture. The mixture was calcined at 550° C. for 1 hour, then 660° C. for 5 hours to obtain the final product ($TiO_2$ hollow spheres).

From a chemical reaction perspective, firstly, $Ti^{4+}$ ions react with $H_2O$ to form $TiO^{2+}$ ions. $TiO^{2+}$ ions then coordinate with $H_2O_2$ to form $[TiO(H_2O_2)]^{2+}$ ions. Simultaneously, $H_2O_2$ reduces to $O_2$ bubbles which are used as templates (Step D). Next, $[TiO(H_2O_2)]^{2+}$ ions adsorb onto the surface of $O_2$ bubbles for a specified number of cycles due to bubble's supramaximal specific surface area (Step E forms a monolayer and Step F forms a multilayer). Urea hydrolyzes at the same time as the temperature rises and it transforms to ammonia ($NH_3.H_2O$) which reacts with [TiO$(H_2O_2)]^{2+}$ to form $TiO(OH)_2$ precipitate. Next, $TiO(OH)_2$ dehydrates to form $TiO_2$ shells (Step G).

The structural morphology is different from that of commercial $TiO_2$ pigments. Based on simple dry mass-volume calculation, the effective density of $TiO_2$ pigment has been determined to be reduced by ~35%.

Inks Formulated with Low Effective Density Titania

White ink dispersions were formulated based on the as-synthesized $TiO_2$ pigments having low effective density as prepared by one of the methods disclosed above. In some examples, the pigments may have a particle size, after milling, of about 100 to 300 nm.

A high-speed high-shear attritor was used to produce the various dispersions. In a typical milling process, low effective density $TiO_2$ pigment (between 5 to 25% NVS—non-volatile solids) was mixed with a dispersant mixture at a speed of between 3,000 and 4,000 rpm for about 3 hr.

The effect of milling media on average pigment size is shown in Table II where 0.1 mm is required to attain ~280 nm pigment size. Particle size was determined by a ZETA-sizer.

TABLE II

Effect of Milling Media on Average Pigment Size*

| Size of Milling Beads (mm) | Particle Size (nm) |
|---|---|
| 0.5 | 1650 |
| 0.2 | 380 |
| 0.1 | 280 |

*Ink mill base: $TiO_2$ 1 g; dispersant 0.5 g; water 98.5 g, milling beads 100 cm³; milling time 3 hr; milling rpm 3,000.

The dispersion stability was monitored via evolution of average particle size with time and visual inspection of pigment sedimentation. Table III shows the measurement of particle sizes via dynamic light scattering at respective checkpoints. It is interesting to note that the average particle size remained relatively constant over a period of at least 45 days. In addition, no visual sedimentation of white pigment was observed.

TABLE III

Particle Size as a Function of Time

| Time (Days) | Particle Size (nm) |
|---|---|
| 0 | 287 |
| 15 | 291 |
| 30 | 285 |
| 45 | 287 |

A white pigment dispersion may comprise: about 10 to 60 wt % of low effective density $TiO_2$; about 1 to 40 wt % of a latex; and the balance a dispersing medium. Examples of suitable latexes may include styrene-acrylic latex, polyurethane latex, polyvinyl acetate, acrylonitrile butadiene styrene (ABS) latex, acrylic polymers, and poly(ethylene acrylic acid).

Examples of suitable dispersing media may include water and low carbon alcohols and mixtures thereof. By "low carbon alcohol" as used herein is meant an alcohol having from 2 to 6 carbon atoms, such as ethanol, propanol, butanol, pentanol, and hexanol and isomers thereof.

White ink dispersions based on the prepared milled base and the presence of latex nanoparticles (i.e. acting as an optical spacers) were formulated and tested for jettability with a thermal inkjet printhead. Examples of latexes and milled bases are shown respectively in Tables IV and VI. The stability of the milled base with latexes is shown further in Table V, where U=unstable and S=stable. The latex with Tg of about 20° C. (Latex 3) was seen to have particularly good compatibility with the milled bases.

TABLE IV

Examples of Latexes.

| Latex* | Details |
|---|---|
| 1 | HP-787-M1 12A19W009 very high $T_g$ (>120° C.) Latex, NVS = 31.3% |
| 2 | HPL 10046-139 ($T_g$ ~77° C.) NVS = 20.2% |
| 3 | HPL 3212-84-1 ($T_g$ ~20° C.) NVS = 21.5% |
| 4 | ROPAQUE ™ ULTRA |

*The information for latexes 1-3 (weight percent of monomers in each latex, where Sty = styrene, BA = butyl acrylate, MAA = methacrylic acid, HMA = hexyl methacrylate, EGDMA = ethylene glycol dimethacrylate):
HP-787-M1 12A19W009: Sty:BA:MAA:EGDMA = 90:5:4:1;
HPL 10046-139: Sty:HMA:MAA:EGDMA = 20:73:6:1;
HPL 3212-84-1: Sty:BA:MAA:EGDMA = 82.5:14:3:0.5;
ROPAQUE ™ Ultra, available from Dow Chemical Co. (Midland, MI), is a non-film-forming synthetic pigment (opaque hollow-sphere polymeric pigment) engineered to provide the most efficient dry hiding.

TABLE V

Stability of the Milled Base with Latexes.

| Ink | Pigment Loading | Latex | Stability | Diluted Stability |
|---|---|---|---|---|
| 1 | 5% | 1 to 3% | U | U |
| 2 | 5% | 2 to 3% | U | U |
| 3 | 5% | 4 to 3% | U | U |
| 4 | 5% | 3 to 3% | S | S |
| 5 | 10% | 3 to 5% | S | S |
| 6 | 5% | 3 to 2.5%; 4 to 2.5% | S | U |
| 7 | 5% | 3 to 1%; 4 to 4% | S | U |

Table V shows that Inks 4 and 5 are stable under both concentrated and dilute conditions. These inks may be suitable for use as white inks.

TABLE VI

Examples of Milled Bases.

| Pigment Loading (TiO$_2$): | 15% | 14% | 14% | 12% |
|---|---|---|---|---|
| HP latex | 5.4% | 5.2% | 4.4% | 3.7% |
| Polymeric Dispersant | 0.0% | 0.0% | 0.4% | 0.3% |
| E-sperse 100 | 2.3% | 2.2% | 2.2% | 1.8% |
| J671 | 2.75% | 2.65% | 1.36% | 1.15% |
| DF31 | 0.37% | 0.37% | 0.57% | 0.49% |

In Table IV, HP latex is a styrene-acrylic latex developed and synthesized at HP Labs. E-sperse 100 is a surfactant available from Ethox Chemicals, LLC (Greenville, S.C.), J671 is Joncryl® HPD 671, a styrene-acrylic pigment dispersion resin available from BASF (Freeport, Tex.). DF31 is DEFOAMER 31 available from Ethox Chemicals, LLC (Greenville, S.C.).

Jetting performance was evaluated using a HP thermal printhead. Good average drop velocity (>10 m/s) was noted with the ink dispersions using the typical firing conditions. Also noted was an absence of nozzle plate puddling with extended firing during the screening process.

Figure 4:
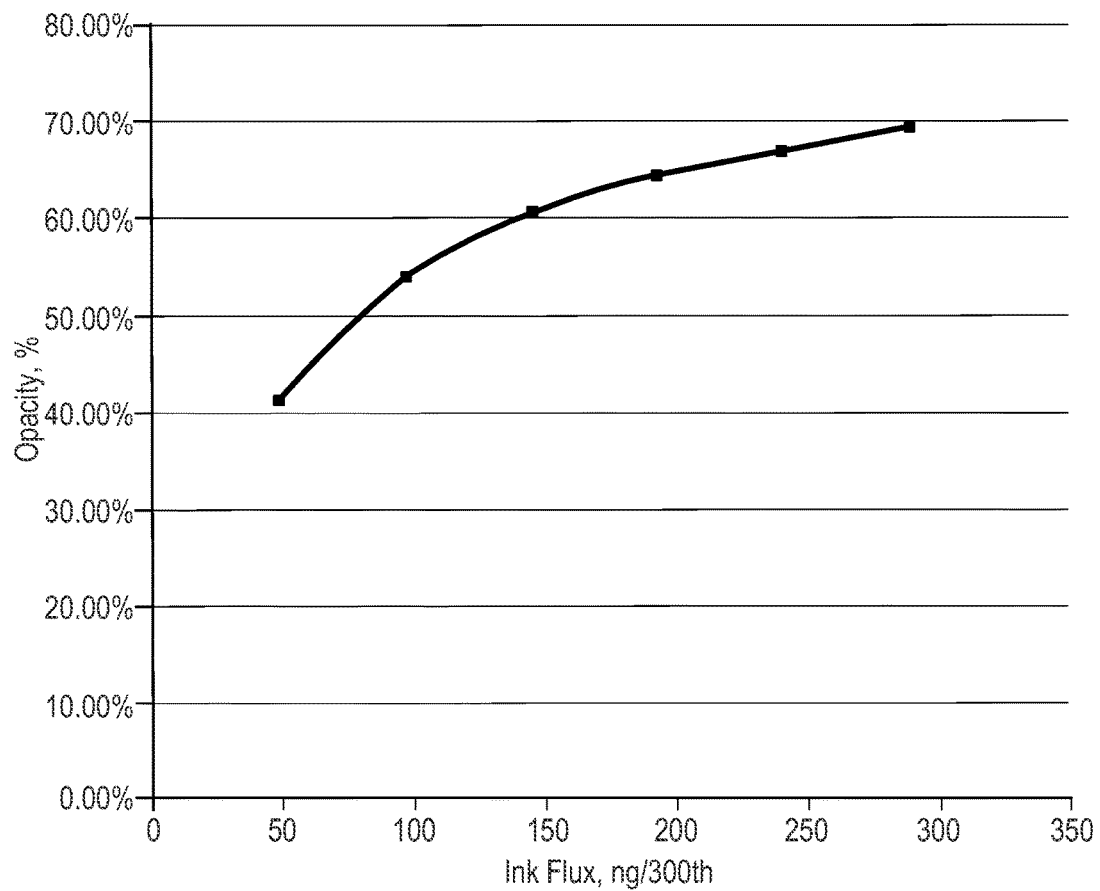
FIG. 4, on coordinates of opacity (in %) and ink flux (in ng/300 th), is a plot showing the good opacity (hiding power) of a white ink, according to an example.

As shown in FIG. 4, an opacity of >50% was observed with an ink flux of ~100 ng/300th for the ink dispersions, where 100 ng/300$^{th}$ means 100 ng per {fraction(1/300)}th inch cell. FIG. 4 shows the evolution of opacity with increasing ink coverage. Opacity is a measure of the extent of blocking light from passing through a media. An opacity of >50% is considered to be acceptable for white pigment-based inks.

The basic composition of the inks may include about 10 to 60 weight percent (wt %) of the white pigment dispersion described above, about 1 to 10 wt % co-solvent, and up to 10 wt % of various other components such as surfactants, biocides, fungicides, sequestering agents, buffering agents and anti-kogation agents and mixtures thereof.

Classes of co-solvents that can be used may include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include 2-pyrrolidinone, derivatized 2-pyrrolidinone including 1-(2-hydroxyethyl)-2-pyrrolidinone, 2-methyl-1,3-propanediol, tetraethylene glycol, and ethylhydroxypropanediol (EHPD), to name a few.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Specific examples of preferred surfactants for use include SOLSPERSE, TERGITOL, DOWFAX, and the like. The amount of surfactant added to the formulation, if included, may range from 0.01% to 10.0% by weight.

Examples of additives that are added to inhibit the growth of harmful microorganisms may include biocides, fungicides, and other anti-microbial agents, which are routinely used in ink formulations. Examples of suitable microbial agents include, but are not limited to, NUOSEPT, UCARCIDE, VANCIDE, PROXEL, and combinations thereof.

Sequestering agents, such as EDTA (ethylenediaminetetraacetic acid), may be included to eliminate the deleterious effects of metal impurities. Such sequestering agents, if present, typically comprise from 0.01 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components. If used, pH adjusting agents typically comprise less than about 10 wt % of the ink-jet ink composition. Similarly, buffering agents can be used such as, but not limited to, TRIS, MOPS, citric acid, acetic acid, MES, etc. If used, buffering agents typically comprise less than about 3 wt % of the ink-jet ink composition and generally from about 0.01 wt % to 2 wt %, most commonly from 0.2 wt % to 0.5 wt %.

Anti-kogation agents that can be used include lithium phosphate, sodium phosphate, phosphate esters of fatty alcohol alkoxylates, and the like, in amounts from about 0.01 wt % to 5 wt %.

The white ink system may have advantages, including high pigment dispersion stability against sedimentation with commercial dispersants, an acceptable level of white opacity, and reliable jetting within the desired jetting conditions of a thermal printhead (10 to 40 ng pens).

What is claimed is:

1. A white pigment dispersion, comprising:
   10 to 60 wt % of porous, low effective density $TiO_2$;
   1 to 40 wt % of a latex; and
   a balance of a dispersing medium;
   wherein the effective density of porous, low effective density $TiO_2$ is less than 4.

2. The white pigment dispersion of claim 1 wherein the effective density of the porous, low effective density $TiO_2$ is within a range of about 2.5 to 3.8.

3. The white pigment dispersion of claim 1 wherein the latex is selected from the group consisting of styrene-acrylic latex, polyurethane latex, polyvinyl acetate, acrylonitrile butadiene styrene (ABS) latex, acrylic polymers, and poly (ethylene acrylic acid).

4. The white pigment dispersion of claim 1 wherein the dispersing medium is selected from the group consisting of water and an alcohol having from 2 to 6 carbon atoms and mixtures thereof.

5. An ink including a white pigment dispersion, including:
   10 to 60 wt % of a white pigment dispersion, the white pigment dispersion comprising:
      10 to 60 wt % of porous, low effective density $TiO_2$,
      1 to 40 wt % of a latex, and
      a balance of a dispersing medium;
      wherein the effective density of the porous, low effective density $TiO_2$ is less than 4;
   1 to 10 wt % of co-solvent; and
   up to 10 wt % of a component selected from the group consisting of surfactants, biocides, fungicides, sequestering agents, buffering agents and anti-kogation agents, and mixtures thereof.

6. The ink of claim 5 wherein the porous, low effective density $TiO_2$ has a particle size within a range of about 100 to 300 nm.

7. A method for manufacturing porous, low effective density $TiO_2$, comprising:
   providing a template having a surface;
   coating the template surface with a titanium-containing compound that can be reduced to $TiO_2$ at high temperature; and
   removing the template, thereby forming porous $TiO_2$ particles;
   wherein the effective density of the porous $TiO_2$ particles is less than 4;
   and wherein the porous, low effective density $TiO_2$ particles are included in a white pigment dispersion, comprising:
   10 to 60 wt. % of porous, low effective density $TiO_2$;
   1 to 40 wt. % of a latex; and
   a balance of a dispersing medium.

8. The method of claim 7 wherein the titanium-containing compound is selected from the group consisting of titanium oxysulfate, titanium diisopropoxide bis(acetylacetonate), titanium(IV) ethoxide, and tetrakis(diethylamido) titanium (IV).

9. The method of claim 7, comprising:
   forming the template comprising a polymer emulsion with carboxylate groups;
   coating the template surface with the titanium-containing compound; and
   removing the polymer template, thereby forming the porous $TiO_2$ particles.

10. The method of claim 7 comprising:
    providing a bubble nucleating agent;
    combining the titanium-containing compound with the bubble nucleation agent and stirring to form the template, which comprises oxygen bubbles, coated with $TiO(OH)_2$;
    removing water; and
    removing the oxygen bubble template, thereby forming the porous $TiO_2$ particles.

11. The method of claim 10 wherein the bubble nucleating agent comprises a mixture of hydrogen peroxide, urea, and water.

12. The method of claim 7 wherein the effective density of the porous $TiO_2$ particles is within a range of about 2.5 to 3.8.

13. The method of claim 7 wherein the template is removed by calcining at a temperature of at least 500° C. for a period of time of at least 5 hours.

14. The white pigment dispersion of claim 2 wherein the porous, low effective density $TiO_2$ has a porosity of about 50%.

* * * * *